United States Patent Office 3,222,159
Patented Dec. 7, 1965

3,222,159
METHOD OF DESTROYING UNDESIRABLE
PLANT GROWTH
Franz Reicheneder and Karl Dury, Ludwigshafen (Rhine),
Herbert Stummeyer, Limburgerhof, Pfalz, and Adolf
Fischer, Mutterstadt, Pfalz, Germany, assignors to
Badische Anilin- & Soda-Fabrik Aktiengesellschaft,
Ludwigshafen (Rhine), Germany
No Drawing. Filed Apr. 13, 1964, Ser. No. 359,508
Claims priority, application Germany, Nov. 21, 1958,
B 51,155; Mar. 25, 1961, B 61,873
10 Claims. (Cl. 71—2.5)

This application is a continuation-in-part of each of our copending applications Serial No. 854,276, filed November 20, 1959; Serial No. 129,541, filed August 7, 1961, and Serial No. 220,030, filed August 28, 1962, all now abandoned.

The present invention relates to a process for the destruction of undesirable plant growth with the aid of new substituted pyridazones. More particularly, it relates to the selective destruction of undesirable plant growth between cultivated plants without damage to the cultivated plants.

The object of the present invention is to destroy undesired plant growth between cultivated plants without damaging the cultivated plants.

Another object of the invention is to provide a process for the effective destruction of weeds with new compounds that take effect very rapidly and produce no deleterious after-effects.

These and other objects of the invention are achieved by treating undesirable plant growth with a phytotoxic amount of a compound of the formula:

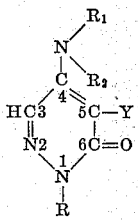

in which R represents a radical selected from the group consisting of phenyl, monochlorophenyl and dichlorophenyl, $R_1$ represents a member selected from the group consisting of hydrogen, alkyl having from 1 to 4 carbon atoms, and monohydroxyalky having from 1 to 3 carbon atoms, α-hydroxy-β-trichloroethyl, acetyl, chloroacetyl, dichloroacetyl, trichloroacetyl, propionyl, chloropropionyl, dichloropropionyl, carbamyl, N-phenyl-carbamyl and N-3-chlorophenyl-cabamyl, $R_2$ has the same meanings as $R_1$, $R_1$ and $R_2$ being identical or different, and $R_1$ may further represent the allyl radical and Y represents a member selected from the group consisting of chlorine and bromine.

The new pyridazones may be prepared in known manner for example by reaction of 1-phenyl-4-amino-5-chloropyridazone-6 with chloral or acids or acid derivatives, for example acid chlorides, advantageously in a solvent, for example, dimethylformamide. The new compounds may further be prepared by reaction of 1-phenyl-4-amino-5-chloropyridazone-6 with isocyanates. For example, 1-phenyl - 4 - chloroacetylamino-5-chloropyridazone-6 is obtained by reaction of 1-phenyl-4-amino-5-chloropyridazone-6 with chloroacetyl chloride. N-phenyl-N'-(1-phenyl - 5 - chloropyridaz - 6 - on-4-yl)-urea is obtained by reaction of 1-phenyl-4-amino-5-chloropyridazone-6 with phenyl isocyanate.

The production of the chloroacetylamino compound is described in greater detail as follows:

22 parts of 1-phenyl-4-amino-5-chloropyridazone-6 of the melting point 202° to 204° C. is dissolved hot in 20 parts of N-methylpyrrolidone in an agitated vessel. 11 parts of chloroacetyl chloride is dripped in with good stirring and the whole heated to 150° C. This temperature is maintained for 10 minutes, then the whole is allow to cool slowly, diluted with water, the crystal slurry filtered off by suction and recrystallized from methanol. 27 parts of a white crystal powder of the melting point 124.5° to 125° C. is thus obtained, which corresponds to a yield of 88% of the theory.

The other compounds to be used according to this invention may be obtained in an analogous manner. However the 1-phenyl-4-amino-5-chloropyridazone-6 may be reacted directly with the free acids or the aldehydes in the presence or absence of solvents.

The pyridazones to be used according to this invention are prepared in a manner known per se by the reaction of the corresponding chlorine-substituted pyridazones with the nitrogenous compounds in question; for example, 1-phenyl-4-amino-5-chloropyridazone-(6) is obtained by reaction of 1-phenyl-4,5-dichloropyridazone-(6) (obtainable by the process described in U.S. specification No. 2,628,181 from mucochloric acid and phenyl hydrazine by splitting off water with the aid of elevated temperature in glacial acetic acid) with ammonia in aqueous suspension under pressure. The pyridazones substituted in 1-position by hydrogen or alkyl radicals are obtained in a corresponding way from mucochloric acid and hydrazine hydrate or monoalkyl hydrazines and subsequent reaction of the 4,5-dihalogenpyridazones-(6) thus obtained with ammonia or amines substituted by organic radicals.

Since all other compounds according to this invention can be prepared by an analogous process, the said preparation will now be described in greater detail:

1,000 parts by weight of 1-phenyl-4,5-dichloropyridazone-(6) (prepared for example according to the said U.S. specification No. 2,628,181) are mixed in a pressure vessel holding 8 liters, with 4,000 parts of water and 600 parts of anhydrous ammonia are forced into the mixture under pressure. Then the vessel is heated for 6 hours at 120° C., the pressure rising to 40 atmospheres. The reaction product is then allowed to cool and decompressed and the pressure vessel flushed repeatedly with nitrogen. The water is then separated from the solid substance and the latter washed repeatedly with dilute hydrochloric acid and then with water. By crystallization from methanol, 588 parts of 1-phenyl-4-amino-5-chloropyridazone-(6) with the melting point 202° to 204° C. are obtained.

Anaylsis.—$C_{10}H_8ON_3Cl$, calculated: C, 54.25; H, 3.62; N, 18.95; Cl, 16.05. Found: C, 54.62; H, 4.08; N, 19.26; Cl, 15.9.

The other compounds to be used according to this invention are obtained analogously. For the reaction with 1-phenyl-4-,5-dichloropyridazone-(6) we prefer to use primary and secondary amino compounds. It should be noted that the less volatile amines can also be reacted without the use of a pressure vessel and that an excess of amine may be used as solvent in the case of amino compounds having a boiling point about 100° C.

Examples of compounds for influencing plant growth according to this invention are:

1-phenyl-4-β,β,β-trichloro-α-hydroxy-ethylamino-5-pyridazone-(6) (M.P. 163° to 166° C.)
1-phenyl-4-acetylamino-5-chloropyridazone-(6)
(M.P. 175° to 176° C.)
1-phenyl-4-chloroacetylamino-5-chloropyridazone-(6)
(M.P. 124.5° to 125° C.)
1-phenyl-4-dichloroacetylamino-5-chloropyridazone-(6)
(M.P. 165.5° to 166.5° C.)

1-phenyl-4-trichloroacetylamino-5-chloropyridazone-(6)
(M.P. 194° to 195° C.)
1-phenyl-4-propionylamino-5-chloropyridazone-(6)
(M.P. 127° to 128° C.)
1-phenyl-4-$\alpha$-chloropropionylamino-5-chloropyridazone-(6) (M.P. 137° to 138° C.)
1-phenyl-4-$\beta$-chloropropionylamino-5-chloropyridazone-(6) (M.P. 119° to 120° C.)
1-phenyl-4-$\alpha,\alpha$-dichloropropionylamino-5-chloropyridazone-(6) (M.P. 148° to 149° C.)
N-phenyl-N'-(1-phenyl-5-chloropyridaz-6-on-4-yl)-urea
(M.P. 174° to 175° C.)
N-3-chlorophenyl-N'-(1-phenyl-5-chloro-pyridaz-6-on-4-yl)-urea (M.P. 210° C.)
1-phenyl-4-amino-5-chloropyridazone-(6)
(M.P. 202° to 204° C.)
1-phenyl-4-methylamino-5-chloropyridazone-(6)
(M.P. 212° C.)
1-phenyl-4-ethylamino-5-chloropyridazone-(6)
(M.P. 156° to 157° C.)
1-phenyl-4-dimethylamino-5-chloropyridazone-(6)
(M.P. 89° to 90° C.)
1-phenyl-4-diethylamino-5-chloropyridazone-(6)
(M.P. 105° to 106° C.)
1-phenyl-4-allylamino-5-chloropyridazone-(6)
(M.P. 163° to 164° C.)
1-phenyl-4-($\beta$-hydroxyethylamino)-5-chloropyridazone-(6) (M.P. 170° to 171° C.)
1-phenyl-4-($\gamma$-hydroxypropylamino)-5-chloropyridazone-(6) (M.P. 115° to 117° C.)
1-phenyl-4-hydroxy-methylamino-5-chloropyridazone-(6) (M.P. 179° to 181° C.)
1-phenyl-4-i-propylamino-5-chloropyridazone-(6)
(M.P. 143° C.)
1-phenyl-4-n-propylamino-5-chloropyridazone-(6)
(M.P. 137° to 138° C.)
1-phenyl-4-n-butylamino-5-chloropyridazone-(6)
(M.P. 83° to 84° C.)
1-phenyl-4-i-butylamino-5-chloropyridazone-(6)
(M.P. 80° to 82° C.)
1-phenyl-4-sec-butylamino-5-chloropyridazone-(6)
(M.P. 169° to 170° C.)
1-m-chlorophenyl-4-amino-5-chloropyridazone-(6)
(M.P. 214° to 216° C.)
1-p-chlorophenyl-4-amino-5-chloropyridazone-(6)
(M.P. 254° to 256° C.)
1-phenyl-4-amino-5-bromopyridazone-(6)
(M.P. 214° to 215° C.)

The new compounds are outstandingly suitable for controlling undesirable plant growth. For this purpose, the plants to be controlled and/or the soil in which these plants grow are treated with a phytotoxic amount of the active substance. This amount depends on the special conditions of application for example climate, type of soil, type of weeds, type of cultivated plants and stage of growth of the weeds and cultivated plants.

We have found that under normal conditions it is sufficient to use amounts of 0.5 to 10 kilograms of active substance per hectare of surface to be treated. We prefer to use an amount of 1 to 6 kilograms of active substance per hectare. The active substances may be used in the usual way. For example, they may be used in the form of their solutions in organic liquids, for example, diesel oil or kerosene, or as aqueous dispersions prepared from the active substances and water using a dispersing agent, for example, sodium lignin sulfonate, or formed by dilution of a concentrated dispersion with water.

They may also be used as dusting agents prepared by mixing the active substances with powdered materials.

We prefer the use of the following active substances because these are especially active:

1-phenyl-4-amino-5-chloropyridazone-(6)
(M.P. 202° to 204° C.)
1-phenyl-4-$\beta,\beta,\beta$-trichloro-$\alpha$-hydroxyethylamino-5-chloropyridazone-(6) (M.P. 163° to 166° C.)
1-phenyl-4-chloroacetylamino-5-chloropyridazone-(6)
(M.P. 124.5° to 125° C.)
N-phenyl-N'-(1-phenyl-5-chloropyridaz-6-on-4-yl)-urea
(M.P. 174° to 175° C.)

The invention is further illustrated by, but not limited to, the following examples.

*Example 1*

Seeds of peas, beetroot, carrots, onions, mustard and wild oats are sown in transverse rows in seed dishes 25 by 30 centimeters) filled with light sandy soil. After most of the plants have developed up to the cotyledon stage, an amount of finely grained mixture equivalent to the use of 3 kilograms of 1-phenyl-4-chloroacetylamino-5-chloropyridazone-(6) and 197 kilograms of calcium nitrate per hectare is uniformly scattered over the plants and the soil in the dishes. Five weeks later it is found that the beetroot and onions have survived this treatment with growth inhibition. Peas show slight chlorotic damage to the edges of the leaves while wild oats, mustard and carrots are practically completely destroyed. Of the weeds which have come up between the cultivated plants, *Galinsoga parviflora, Matricaria chamomilla, Urtica urens, Poa annua, Chenopodium album* and *Stellaria media* are practically completely withered.

The following phenylpyridazones, when used in admixture with calcium nitrate with the same amount of active substance, have similar action:

1-phenyl-4-acetylamino-5-chloropyridazone-(6)
1-phenyl-4-dichloroacetylamino-5-chloropyridazone-(6)
1-phenyl-4-trichloroacetylamino-5-chloropyridazone-(6)
1-phenyl-4-propionylamino-5-chloropyridazone-(6)
1-phenyl-4-$\beta$-chloropropionylamino-5-chloropyridazone-(6)
1-phenyl-4-$\alpha,\alpha$-dichloropropionylamino-5-chloropyridazone-(6)

*Example 2*

Sugar beet plants in a cultivated area, after thinning out and hoeing the soil, are sprayed with 1-phenyl-4-$\beta,\beta,\beta$-trichloro-$\alpha$-hydroxy-ethylamino-5-chloropyridazone-(6), used in an amount equivalent to 4 kilograms of active substance dispersed in 1000 liters of water per hectare. No fresh growth of weeds is observed between the individual rows up to the harvesting of the beetroot plants. The following weeds are destroyed as they come up or in the cotyledon stage: *Urtica urens, Chenopodium album, Galinsoga parviflora, Poa annua* and *Panicum sanguinale*. The beetroot plants suffer no damage by this treatment.

*Example 3*

1 - phenyl-4-chloroacetylamino-5-chloropyridazone-(6) is sprayed in autumn in an amount equivalent to an application of 3 kilograms thereof dispersed in 1000 liters of water per hectare onto a winter barley crop which is infested with *Agrostis spica venti, Stellaria media* and *Galium aparine*. After about four weeks, all three types of weed plant have for the most part withered. The winter barley exhibits a slight growth depression, but then grows normally without damage.

*Example 4*

Beetroot and onions are sown in a cultivated area. After the plants have sprouted (height of growth 5 to 10 cm.) 1-phenyl-4-chloroacetylamino-5-chloropyridazone-(6) is sprayed on the beetroot and onion plants in an amount equivalent to 3 kilograms of active substance dispersed in 1000 liters of water. Four to five weeks later, the cultivated plants are growing well. The effect on the weeds after the same period may be seen from the following table which gives the number of weed plants ascertained in each case; the numbers are average values of sixteen repetitions.

TABLE

| Weed | Untreated control area | Area treated with 3 kg. per hectare of active substance |
|---|---|---|
| Chenopodium album | 112 | 24 |
| Stellaria media | 102 | 14 |
| Polygonum persicaria | 38 | 4 |
| Cruciferae | 52 | 3 |
| Galinsoga parviflora | 14 | 0 |
| Chamomilla matricaria | 11 | 0 |
| Urtica urens | 19 | 2 |
| Sonchus arvensis | 13 | 4 |
| Papaver rhoeas | 9 | 5 |
| Lalium amplexicaule | 21 | 2 |
| Rumex acetosella | 16 | 3 |
| Avena fatua | 9 | 6 |
| Other grasses | 116 | 11 |
| Total | 532 | 78 |

*Example 5*

N - phenyl - N'-(1-phenyl-5-chloropyridaz-6-on-4-yl)-urea is sprayed on the following plants in a greenhouse in an amount of active substance equivalent to 3 and 6 kilograms per hectare dispersed in 1000 liters of water: *Sinapis alba, Avena sativa, Poa annua, Galium aparine, Galinsoga parviflora,* and *Polygonum persicaria.* The beginning of the toxic action of the agent is observed at the leaf tips of the plants after four or five days. After another eleven days, the plants have completely withered.

*Example 6*

Soil is treated with 1-phenyl-4-amino-5-chloropyridazone-(6) (melting point 202° to 204° C.) in amounts of 3 to 8 kilograms per hectare. The active substance is sprayed onto the soil as an aqueous dispersion which has preferably been prepared by adding from 20 to 50%, with reference to the active substance, of a dispersing or emulsifying agent, for example sodium ligninsulfonate. It is true that from seeds of *Sinapis alba, Panicum sanguinale,* and *Galium aparine,* which have been sown in the soil thus treated, plants grow up to the cotyledon stage, but they have completely died after about three weeks.

*Example 7*

1 - phenyl - 4-amino-5-chloropyridazone-(6) (melting point 202° to 204° C.) is sprayed in amounts corresponding to 5 to 10 kilograms per hectare suspended in 1,000 liters of water onto the following plants in the greenhouse: *Sinapis alba, Galium aparine, Poa annua, Polygonum persicaria, Veronica agrestis* and *Lamium amplexicaule.* After about 3 days, the plants exhibit a chlorotic lightening and begin to winter from the tips of the leaves. They are completely destroyed after four weeks.

*Example 8*

An area of arable soil which is infested mainly with the following weeds: *Galinsoga parviflora, Raphanus raphanistrum, Sinapis alba, Lamium amplexicaule, Fumaria officinalis, Vicia hirsuta, Polygonum persicaria, Matricaria inodora, Poa annua, Atriplex patulum,* and *Stellaria media,* is sprayed with 1-phenyl-4-amino-5-chloropyridazone-(6) (melting point 202° to 204° C.) in amounts of 10 to 20 kilograms per hectare suspended in 500 liters of water. Most of the weeds are completely destroyed after five weeks.

*Example 9*

Bean plants four to five weeks old are dusted with a powder made from 15 parts of 1-phenyl-4-amino-5-chloropyridazone-(6) (melting point 202° to 204° C.) and 85 parts of ground clay. After four to eight days, these plants exhibit very marked leaf burning. A similar effect is achieved by the equivalent use of the following substances:

Substance: Melting point, °C.
1-phenyl-4-methylamino-5-chloropyridazone-(6) _____ 212
1-phenyl-4-ethylamino-5-chloropyridazone-(6) _____ 156 to 157
1-phenyl-4-dimethylamino-5-chloropyridazone-(6) _____ 86 to 90
1-phenyl-4-diethylamino-5-chloropyridazone-(6) _____ 105 to 106

*Example 10*

Rye, *Avena fatua, Sinapis arvensis,* and lettuce are sown in adjacent double rows in open ground and immediately after sowing treated in separate parcels each 2 square meters in size with the following emulsions and dispersions in amounts of 1, 2.5 and 5 kilograms per hectare in 500 liters of water:

Substance I: 3,4,5-trichloropyridazine
Substance II: 3,4,5,6-tetrachloropyridazine
Substance III: 1-phenyl-4-amino-5-chloropyridazone-(6) (melting point 202° to 204° C.)

From the following table the superior effect of phenylaminochloropyridazone as compared with the two chlorinated pyridazines can be clearly seen.

| Active substance (kg per hectare) | Substance I | | | Substance II | | | Substance III | | |
|---|---|---|---|---|---|---|---|---|---|
| | 1 | 2.5 | 5 | 1 | 2.5 | 5 | 1 | 2.5 | 5 |
| Rye | 0 | 0-1 | 2 | 0 | 0 | 0-1 | 4 | 4-5 | 5 |
| Avena fatua | 0 | 0-1 | 1-2 | 0 | 0 | 1 | 4 | 5 | 4 |
| Sinapis arvensis | 1 | 4 | 4-5 | 1 | 2 | 3-4 | 4-5 | 5 | 5 |
| Lettuce | 1-2 | 3 | 4 | 0-1 | 1-2 | 3 | 4-5 | 5 | 5 |

Valuation scheme as to plant damage:
 0=no damage
 1=single leaves with quite slight damage
 2=slight damage or inhibition of most of the plants
 3=marked damage, but leaves not withering, whole plants damaged
 4=the greater part of the leaves and individual plants withered
 5=plants completely destroyed

*Example 11*

Onions sown in open ground are treated, eight days after the tips of the same have pushed through the surface of the soil, in each hectare with dispersions, each of 1.3 kilograms in 500 liters of water, of (I) 1-phenyl-4-amino-5-chloropyridazone-(6) (melting point 202° to 204° C.), (II) para-chlorophenyldimethylurea and (III) 2-chloro-4,6-bis-ethylamino-s-triazine. Six weeks later it is observed that the onions in the parcels treated with (I) exhibit good growth and no substantial damage, whereas those in the parcels treated with (II) and (III) are almost completely destroyed. As weedkillers all three chemical compounds are practically equivalent in effect. The following weeds are severely damaged in growth or completely destroyed: *Matricaria inodora, Galinsoga parviflora, Stellaria media, Sinapis arvensis, Spergula arvensis, Polygonum persicaria,* and *Poa annua.*

*Example 12*

On each hectare of uncultivated land there are uniformly sprayed suspensions having each an amount of active substance of 22 kilograms in 1,000 liters of water, the active substances used being (I) 1-phenyl-4-dimethylamino-5-chloropyridazone-(6) (melting point 89° to 90° C.) and (II) 2-chloro-4,6-bis-ethylamino-s-triazine. The plants on the uncultivated land are as follows: *Holcus mollis, Holcus lanatus, Poa bulbosa, Lolium perenne,*

*Taraxacum officinale, Achillea millefolium,* and *Tanacetum vulgare.* In mainly dry weather, a clear leaf corroding action is observed even after six to eight days on the parcels treated with substance (I). On the contrary no herbicidal effect can be detected after the same period of time on the surfaces treated with substance (II).

What we claim is:

1. A method of controlling weeds which comprises treating the weeds with a phytotoxic amount of a compound of the formula:

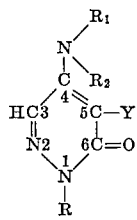

in which R represents a radical selected from the group consisting of phenyl, monochlorophenyl and dichlorophenyl, $R_1$ represents a member selected from the group consisting of hydrogen, allyl, alkyl having from 1 to 4 carbon atoms, monohydroxyalkyl having from 1 to 3 carbon atoms, α-hydroxy-β-trichloroethyl, acetyl, chloroacetyl, dichloroacetyl, trichloroacetyl, propionyl, chloropropionyl, dichloropropionyl, carbamyl, N-phenyl-carbamyl and N-3-chlorophenyl-carbamyl, $R_2$ represents a radical selected from the group consisting of hydrogen, alkyl having from 1 to 4 carbon atoms and monohydroxyalkyl having from 1 to 3 carbon atoms, and Y represents a member selected from the group consisting of chlorine and bromine.

2. A method of controlling weeds which comprises treating the soil in which the weeds grow with a phytotoxic amount of a compound of the formula:

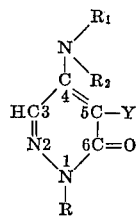

in which R represents a radical selected from the group consisting of phenyl, monochlorophenyl and dichlorophenyl, $R_1$ represents a member selected from the group consisting of hydrogen, allyl, alkyl having from 1 to 4 carbon atoms, monohydroxyalkyl having from 1 to 3 carbon atoms, α-hydroxy-β-trichloroethyl, acetyl, chloroacetyl, dichloroacetyl, trichloroacetyl, propionyl, chloropropionyl, dichloropropionyl, carbamyl, N-phenyl-carbamyl and N-3-chlorophenyl-carbamyl, $R_2$ represents a radical selected from the group consisting of hydrogen, alkyl having from 1 to 4 carbon atoms and monohydroxyalkyl having from 1 to 3 carbon atoms, and Y represents a member selected from the group consisting of chlorine and bromine.

3. A method of controlling weeds as claimed in claim 1 wherein said compound is 1-phenyl-4-amino-5-chloropyridazone-(6).

4. A method of controlling weeds as claimed in claim 1 wherein said compound is 1-phenyl-4-β,β,β-trichloro-α-hydroxy-ethylamino-5-pyridazone-(6).

5. A method of controlling weeds as claimed in claim 1 wherein said compound is 1-phenyl-4-chloroacetylamino-5-chloropyridazone-(6).

6. A method of controlling weeds as claimed in claim 1 wherein said compound is N-phenyl-N'-(1-phenyl-5-chloropyridaz-6-on-4-yl)-urea.

7. A method of controlling weeds as claimed in claim 2 wherein said compound is 1-phenyl-4-amino-5-chloropyridazone-(6).

8. A method of controlling weeds as claimed in claim 2 wherein said compound is 1-phenyl-4-β,β,β-trichloro-α-hydroxy-ethyl-amino-5-pyridazone-(6).

9. A method of controlling weeds as claimed in claim 2 wherein said compound is 1-phenyl-4-chloroacetylamino-5-chloropyridazone-(6).

10. A method of controlling weeds as claimed in claim 2 wherein said compound is N-phenyl-N'-(1-phenyl-5-chloropyridaz-6-on-4-yl)-urea.

References Cited by the Examiner
UNITED STATES PATENTS
2,945,857    7/1960    Hammann _____ 71—2.5 X

OTHER REFERENCES

Reicheneder et al., German application 1,105,232, printed April 20, 1961.

Reicheneder et al., German application 1,107,998, printed May 31, 1961.

LEWIS GOTTS, *Primary Examiner.*